United States Patent [19]
Gabriel et al.

[11] Patent Number: 4,937,584
[45] Date of Patent: Jun. 26, 1990

[54] ADAPTIVE PHASE-SHIFTER NULLING TECHNIQUES FOR LARGE-APERTURE PHASED ARRAYS

[75] Inventors: William F. Gabriel, Annandale, Va.; Theodore C. Cheston, Bethesda, Md.

[73] Assignee: United States of America as represented by the Secretary of the Navy, Wash.

[21] Appl. No.: 288,184

[22] Filed: Dec. 22, 1988

[51] Int. Cl.⁵ .......................... G01S 3/16; G01S 3/28
[52] U.S. Cl. .................................... 342/378; 342/154
[58] Field of Search ............... 342/378, 380, 381, 384, 342/385, 154

[56] References Cited

U.S. PATENT DOCUMENTS

| | | | |
|---|---|---|---|
| 4,555,706 | 11/1985 | Haupt | 342/379 |
| 4,575,724 | 3/1986 | Wiener | 342/383 |
| 4,720,712 | 1/1988 | Brookner et al. | 342/383 |

Primary Examiner—Theodore M. Blum
Attorney, Agent, or Firm—Thomas E. McDonnell; Peter T. Rutkowski

[57] ABSTRACT

A method of nulling out interference sources in a large-aperture phased array radar system is described. The system has apriori knowledge of the interference sources and depends upon access to the array element phase shifters for injection of phase only or phase and amplitude perturbations, of a mainbeam aperture distribution, into said array element phase shifters. The phase or phase and amplitude perturbations are derived from an aperture ripple modulation algorithm. The system does not require any auxiliary elements or correlators or beamformers.

A method of nulling out interference sources in a monopulse large-aperture phased array radar system is also described wherein the phase only or phase and amplitude perturbations are injected into both the sum and difference beams.

9 Claims, 9 Drawing Sheets

ADAPTIVE PHASE-SHIFTER NULLING TECHNIQUES FOR LARGE-APERTURE PHASED ARRAYS

BACKGROUND OF THE INVENTION

1. Field of the Invention

This invention relates generally to sidelobe cancelling techniques for large-aperture phased arrays, and more particularly to phase-shifter nulling techniques which require no auxiliary elements or correlators or beamformers.

2. Background Description

The particular type of antenna system addressed is a large aperture(in wavelengths) phased array of low-sidelobe design wherein the investment is already considerable, and one simply could not afford to make it fully adaptive. The RADC Space-Based-Radar (SBR) antenna system concept as discussed in "An Experimental Completely Overlapped Subarray Antenna," by H. L. Southall and D. T. McGrath, IEEE Trans. Antennas and Prop., Vol. AP-34, pp. 465–474 (April 1986), is an excellent application case in point. The low sidelobes are necessary for good initial protection against sidelobe interference and large clutter returns. Also, they reduce the problems associated with strong sources, i.e., in regard to the number of adaptive degrees-of-freedom (DOF) required and the dynamic range of the adaptive processor. Thus, retention of the low sidelobes is considered a major requirement for the system.

Several partially-adaptive array techniques have been suggested in the literature for approaching this problem, including the conventional Side-Lobe-Canceller (SLC) configuration shown in "Adaptive Arrays," by S. P. Applebaum, IEEE Trans. Antennas Prop., Vol. AP-24, pp. 585–598, (September 1976), constrained beamspace adaptive systems as described in "Adaptive Nulling with Multiple-Beam Antennas," by J. T. Mayhan, IEEE Trans. Antennas and Prop., AP-26, pp. 267–273, (March 1978), and overlapped sub-array (space-fed lens) configurations as shown in "An Adaptive Low-Angle Tracking System," by E. C. DuFort, IEEE Trans. Antennas and Prop., AP-29, pp. 766–722, (September 1981). A brief commentary on each of these solutions follow:

Conventional SLC

This configuration is illustrated in FIG. 1 and consists of a high-gain main beam antenna 12 surrounded by an auxiliary array of a few low-gain elements 14. It has proven popular over the years because it can provide a modest protection against sidelobe interference for the least cost, with the cost being roughly proportional to the number of degrees-of-freedom implemented. The SLC concept is economically attractive as a starting point, but the specific arrangement of FIG. 1 has some drawbacks resulting from the fact that the auxiliary array is separate from the mainbeam antenna 12 and it operates in element space. This makes it virtually impossible to achieve low adaptive sidelobes because of the inherently wide element pattern coverage, the ofttimes presence of array configuration grating lobes, and the differing polarization responses. Consider the two SLC auxiliary pattern options indicated in FIG. 2, where we show cancellation of a single emitter via a single auxiliary element (dashed lines) and a single auxiliary beam (solid lines). Note that the emitter is nulled out by either option, but the adapted pattern sidelobe effects are quite different. The auxiliary SLC beam will have very little effect upon the remainder of the adapted pattern sidelobes because of its highly localized interaction beamwidth region, whereas the auxiliary SLC element interacts across the entire adapted pattern sidelobe region because of its broad element pattern. In general, the auxiliary elements option will produce increasing adaptive sidelobe degradation as the number of interference sources increases. Also, there can be a significant reduction in output SNR due to coupling in additional receiver noise along with the auxiliary element signals.

Constrained Beamspace Antenna Systems

There are many different possible configurations within this category. FIG. 3 illustrates a schematic diagram of one particular type of constrained beamspace system taken from a publication entitled "Constrained Beamspace Sidelobe Canceller (SLC) with a Tapped Delay Line on Each Beam," by W. F. Gabriel, NRL Memorandum Report No. 6042, (September 1987). It consists of two beamformer subsystems 16 and 22 which connect into common array aperture elements 20. The use of common elements 20 helps to avoid polarization problems in the adaptive nulling performance. The mainbeam subsystem 16 is intended to function as a conventional low-sidelobe phased array capable of electronic scan over the region of interest. Sidelobe level is determined by the usual quality of the elements, phase modules, and corporate feed. The second beamformer subsystem 22 is intended to furnish a set of SLC beams for selective subtraction from the mainbeam. Thus, it is referred to as the SLC subsystem. This SLC subsystem 22 is auxiliary to the mainbeam subsystem 16 and consists of a beamformer which is coupled into the aperture at the elements, prior to the TR module phase spitters 25. This beamformer does not require low-sidelobe design and may consist of either a Butler matrix type or a lens type such as a Rotman lens. A very favorable feature from the standpoint of potential bandwidth is that all beams have the same phase center, i.e., the geometric center of the array aperture. Orthogonality in the family of beams is desirable but need not be precise.

The output beam ports connect into a "Beam Assignment Selector" 24 wherein they are electronically switched into the SLC algorithm processor 26 based upon source location estimates. The idea is to connect in only enough SLC beams to cancel a given source distribution situation, thus minimizing sidelobe degradation. The general principles of beamspace SLC have been shown to offer advantages of a stable mainbeam, retention of low sidelobes, very fast adaptive response, and no adaptive grating lobes.

Each of the selected beams feed into a tapped delay line 18, usually referred to as a transversal filter. It is this latter arrangement that permits adaptivity in the time/frequency domain in addition to adaptivity in the spatial domain. The Transversal Filter (TF) output taps then feed into the black box labelled "SLC Algorithm Signal Processor" 26, which applies an adaptive algorithm to obtain the TF tap weights for achieving cancellation. This type of system is amenable to any of the current adaptive processing algorithms, including even analogue versions.

A third subsystem indicated in FIG. 3 is the Source Estimation Processor 28. This is an all-digital processor which operates on 14 the signals received from a few of the aperture elements in order to detect and track the interference sources of interest. Processing of the digital signals to estimate the sources may be carried out in accordance with a number of spectral estimation algorithms available in the literature e.g. See "Using Spectral Estimation Techniques in Adaptive Processing Antenna Systems," by W. F. Gabriel, IEEE Trans. Antennas and Prop., Vol. AP-34, pp. 291–300, (March 1986). Once the source estimation information is available, then beamformer beams are assigned via a computer logic program.

Overlapped Subarray Antenna Systems

As in the previous category, there are many possible configurations within this one. The particular type chosen for illustration is taken from Southall and McGrath, "An Experimental Completely Overlapped Subarray Antenna," IEEE Trans. Antennas and Prop., Vol. AP-34, pp. 465–474, (April 1986), and its antenna layout drawing for completely overlapped subarray antenna (COSA) is shown in FIG. 4. It consists of a space-fed, two-dimensional bootlace lens system in which the space-feed is a Rotman lens beamformer 30. Excitation of one of the beamformer inputs, or subarray ports, results in a sin(x)/x illumination of the bootlace lens. The bootlace lens, in turn, then transforms its illumination into a near-rectangular far-field pattern function which may be scanned by phase shifters behind the objective lens front face. All of the subarray ports may be driven simultaneously (the resulting illuminations on the objective lens completely overlap one another) and coherently combined and weighted to synthesize a tapered illumination on the objective lens, thereby producing a low sidelobe far-field pattern. Because of the Fourier transform principles of operation, this type of space-feed is often referred to as a transform feed.

A distinct advantage permitted by this type of antenna system is wide instantaneous bandwidth, obtained by applying the appropriate time delays at subarray ports. Note that the number of time delays required in the transform feed is far less than the number that would be required to time-delay steer the objective lens, and yet it can synthesize an approximate equivalent time-delay steering over considerable bandwidth.

Since the subarray phase centers are located many wavelengths apart, the objective-lens aperture array factor will contain grating lobes. The resultant overall far-field pattern is the product of this array factor and the flat-topped sub-array pattern. The sub-array pattern can be considered a window which selects the array factor mainlobe at a given steering direction and suppresses all grating lobes. System bandwidth is eventually limited by the fact that the subarray pattern is phase-steered and will shift in angle vs frequency. Also, although the array factor mainlobe remains fixed because of its time-delay steering, all grating lobes will shift in angle vs frequency and may abet intrusion into the shifting subarray window.

From a partially adaptive antenna point of view, this configuration offers three basic adaptive control alternatives.

The first alternative is the subarray input beam ports on the transform feed. The second control alternative is the focal plane element radiators on the transform feed, and the third control alternative is the objective lens element phase-shifters and/or element transceiver modules. The first alternative would require the fewest adaptive weight degrees-of-freedom (DOF) and should enable excellent adaptive performance within the confines of the flat-topped subarray pattern, i.e., in the "near-in" sidelobe region. Outside of the subarray pattern, i.e., in the "far-out" sidelobe region, adaptive performance is inferior because of coupled disturbance into the "near-in" sidelobe region, i.e., the entire subarray pattern must fluctuate in accordance with adaptive weight fluctuations. Mainbeam and/or sidelobe level adaptive constraints will be required to prevent excessive perturbations from "far-out" sidelobe interference.

The second alternative will have performance characteristics similar to the first alternative since they are related by a linear transformation. However, some differences are possible due to the change in objective lens illumination per adaptive weight, i.e., each adaptive weight now controls a pencil beam in the far-field. For example, one could consider certain combinations of amplitude-only and phase-only adaptive control that may be more economical than the first alternative.

The third alternative should enable the best "far out" sidelobe region adaptive performance because its adaptive DOF can be designed to cover the entire sidelobe region of interest, even when the objective lens aperture is divided into a reasonable number of subarray "elements". Mainbeam constraints should not be required. However, this alternative is susceptible to bandwidth degradation and, in addition, the hardware cost will be higher because of signal acquisition transfer complexity. Signals from the adaptively controlled subarray "elements" must be acquired and transferred from the lens to the receiver-processor, and then the resultant control signals from the receiver-processor sent back to the lens and distributed among the elements.

The typical sidelobe canceller as discussed above uses an auxiliary collector to obtain a sample of an interfering signal which is then used to subtract (cancel) that same signal entering the main antenna through a sidelobe. In effect the SLC radiation pattern is combined with the main radiation pattern. To avoid deterioration of overall sidelobes, the SLC radiation pattern should have a well formed narrow beam that is pointed at the interfering signal. The same antenna aperture can be used for both normal system operation and SLC, provided separate beamformers are available so that the two beams can be independently pointed and adjusted in amplitude and phase for sidelobe cancellation. This last requirement adds considerable complexity to the antenna hardware, particularly so if several SLC circuits are required to cancel several interfering signals with several beamformers.

The foregoing illustrates limitations known to exist in present phased array radar systems. Thus, it is apparent that it would be advantageous to provide an alternative directed to overcoming one or more of the limitations as set forth above. Accordingly, a suitable alternative is provided including features more fully disclosed hereinafter.

SUMMARY OF THE INVENTION

By this invention, a method of nulling out interference sources in a large-aperture phased-array radar system having apriori knowledge of said interference sources and depends upon access to the array element phase shifters for injection of phase only or phase and amplitude perturbations of the mainbeam aperture distribution into said array element phase shifters. The phase or phase and amplitude perturbations are derived from an aperture ripple modulation algorithm.

The invention also relates to a method of nulling out interference sources in a monopulse large-aperture phased array radar wherein the phase or phase and amplitude perturbations are utilized in both the sum and difference beams.

It is an object of the present invention to provide a simple phase-shifter nulling technique for application to large-aperture phased arrays.

Another object of the invention is to provide a phase-shifter nulling technique having a modest partial adaptive capability at reasonable cost for large aperture phased arrays.

A further object of the invention is to provide a SLC system that does not require any auxiliary elements or correlators or beamformers.

Still another object of the invention is to facilitate fast cancellation of interference sources with apriori knowledge of said sources.

Other objects, advantages, and novel features of the invention will become apparent from the following detailed description of the invention when considered with the accompanying drawings.

DESCRIPTION OF THE PREFERRED EMBODIMENT

Figure 1:
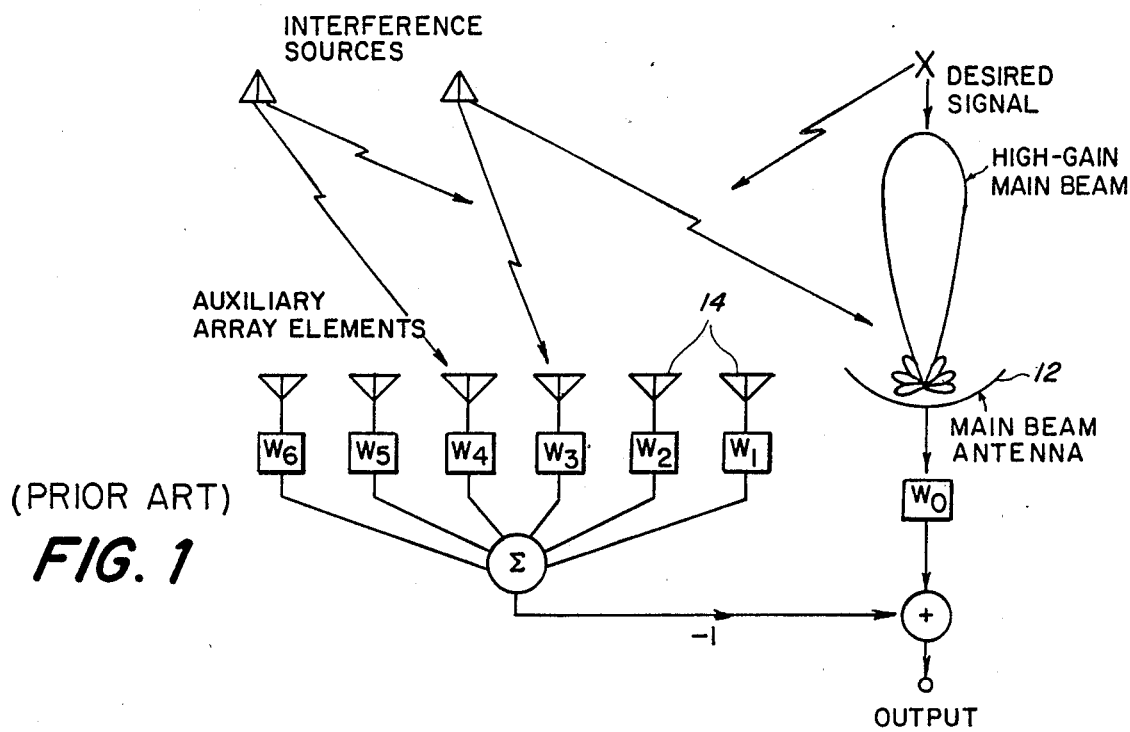
FIG. 1 is a schematic diagram of a conventional adaptive sidelobe-canceller (SLC) configuration.
Figure 2:
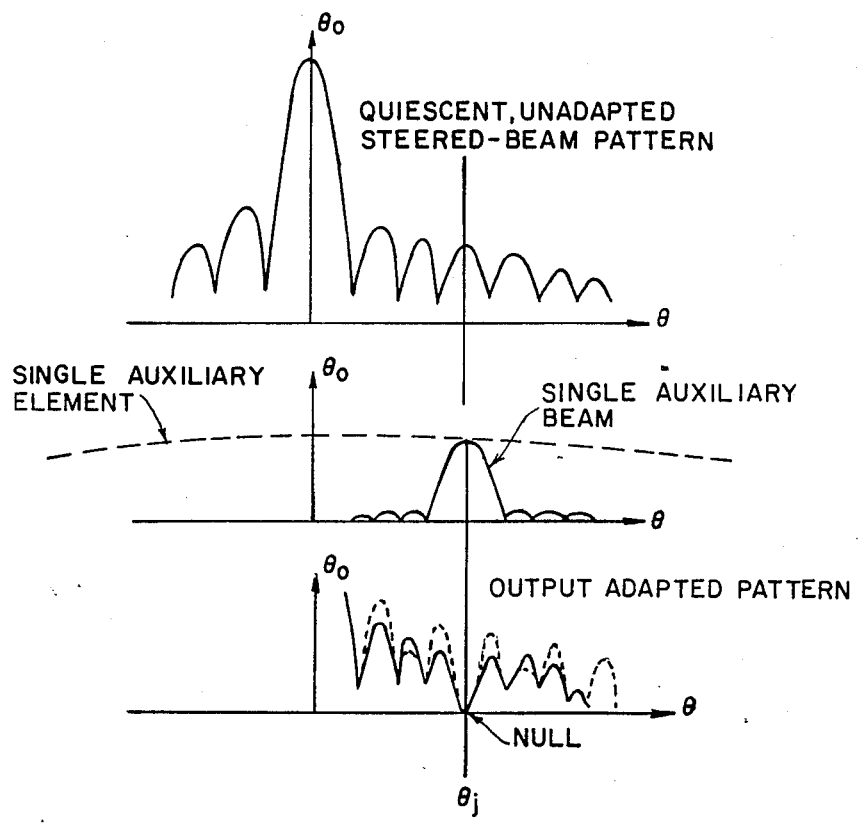
FIG. 2 is a graph illustrating a comparison between the cancellation of a single auxiliary element and a single auxiliary beam.
Figure 3:
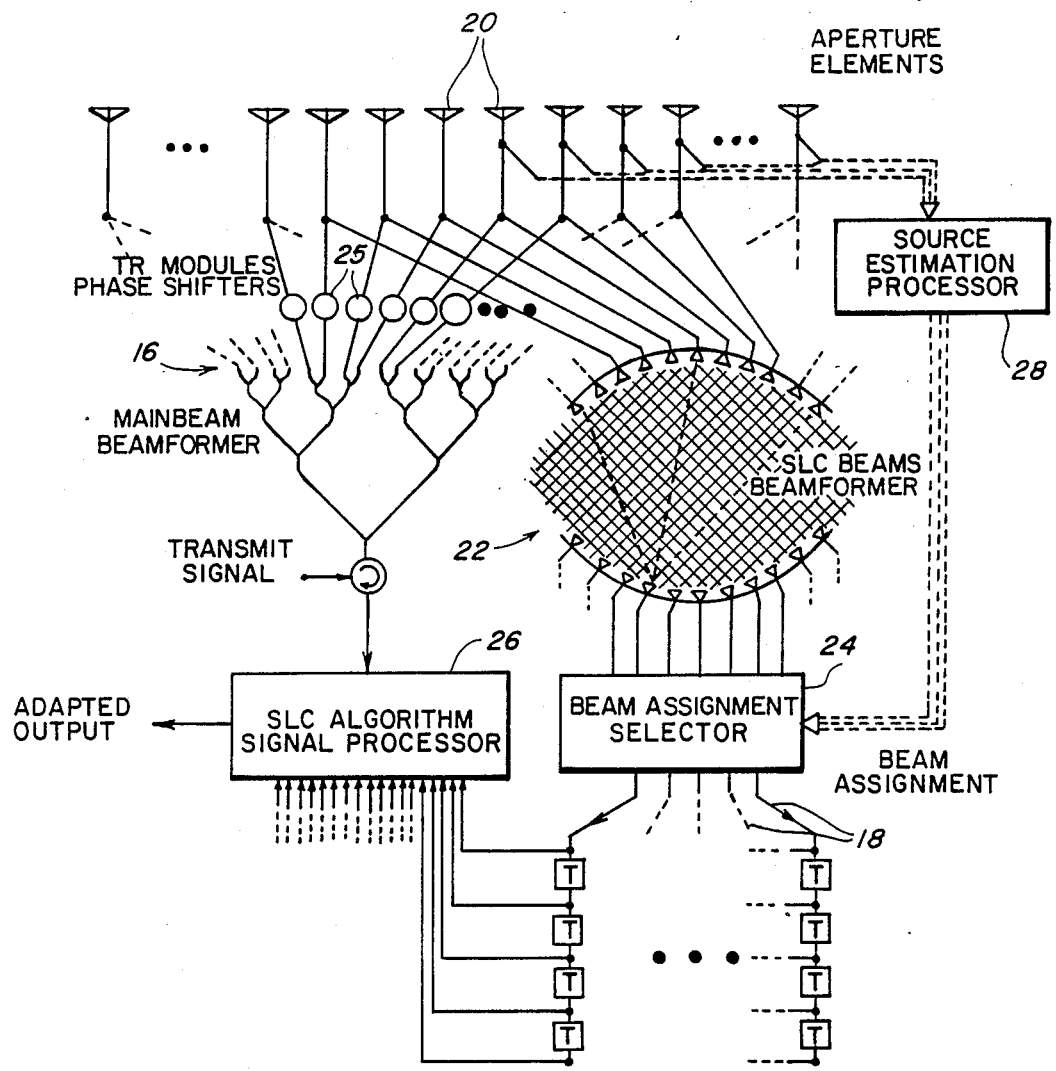
FIG. 3 is a schematic diagram of a Constrained Beamspace SLC system with a tapped delay line on each assigned beam.
Figure 4:
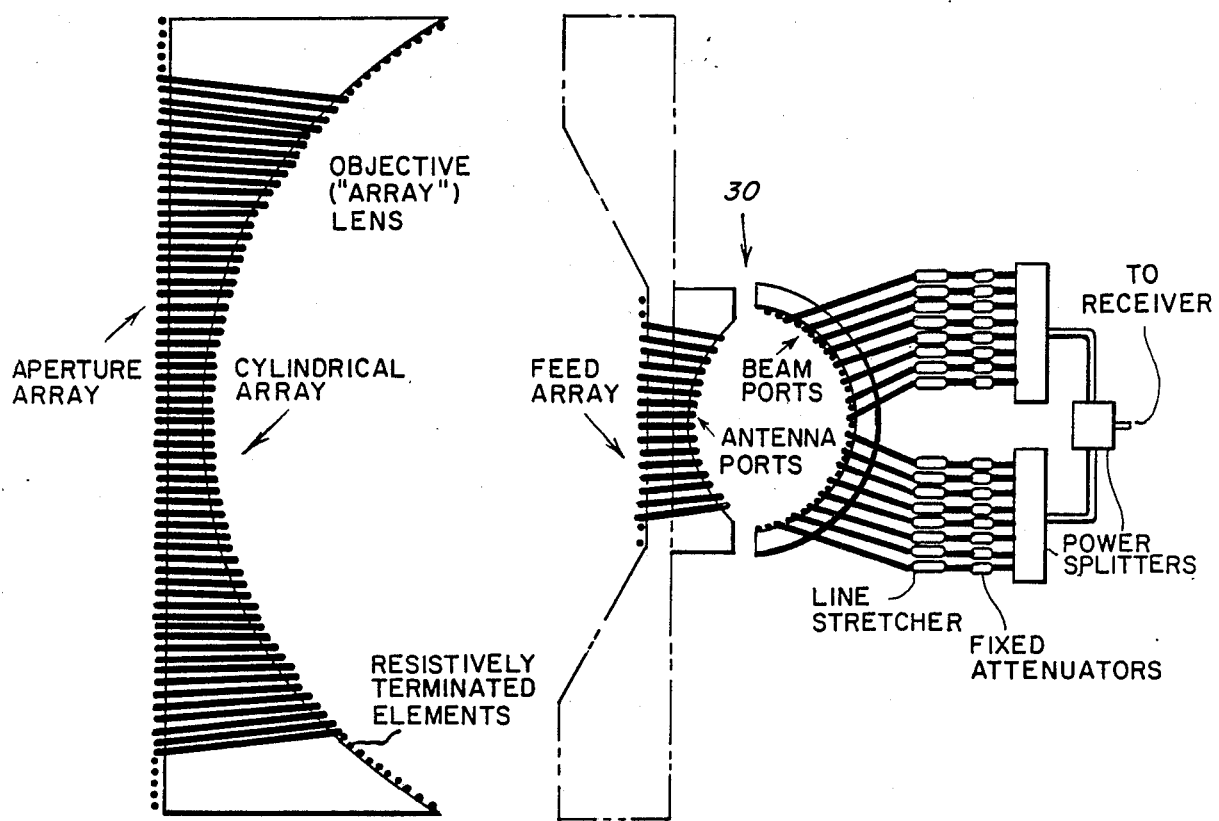
FIG. 4 is a schematic diagram of a Completely Overlapped Sub-array Antenna (COSA) system.
Figure 5:
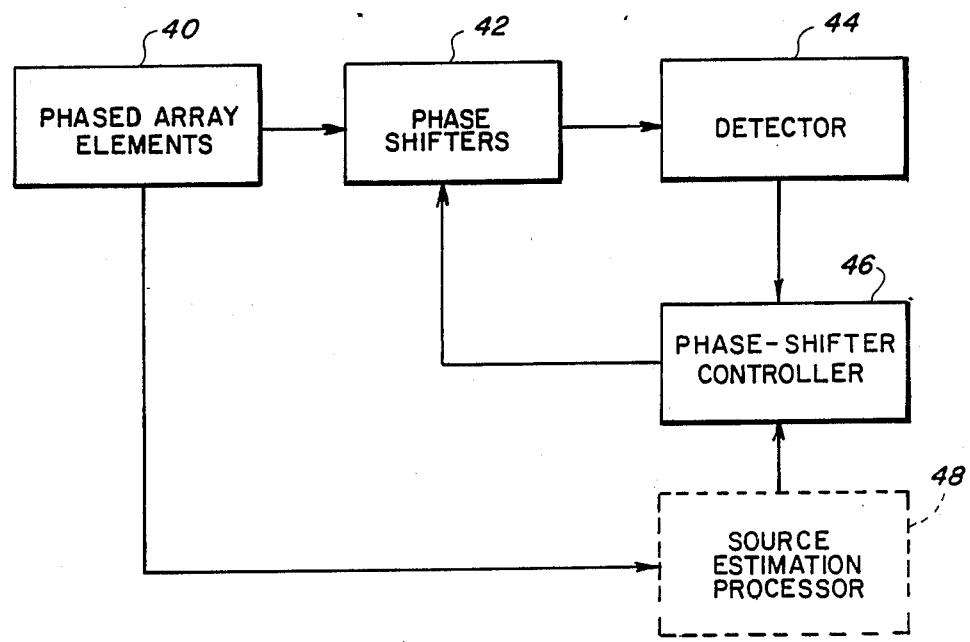
FIG. 5 is a block diagram of a typical large-aperture phased array system which utilizes the phase shifter nulling technique of the current invention.

When phase-shifter nulling techniques are combined with simple adaptive search algorithms, this nulling method is the most simple and least expensive of all adaptive techniques available. It does not require any auxiliary elements or correlators or beamformers, but depends upon access to the array element phase shifters for injection of small phase (and/or amplitude) perturbations of the mainbeam aperture distribution. In FIG. 5 there is shown a block diagram of a typical large-aperture phased array system which utilizes an adaptive phase-shifter nulling technique. The system includes phased array elements 40 which are connected to phase shifters 42. A detector 44 monitors some performance criteria, such as the mainbeam output power and sends a signal to the phase-shifter controller 46. The phase-shifter controller 46 is also connected to the phase shifters 42 for injection of small phase (and/or amplitude) perturbations. A source estimation processor 48 is connected to the phased array elements 40, for a determination of sources to be nulled out, and to the phase-shifter controller 46. The sources may also be determined either by mainbeam tracking of the sources or a separate source estimation processor 48. The individual elements of this system are well known to those skilled in the art. However, the phase-shifter controller 46 is modified to incorporate the software for injecting phase or phase and amplitude perturbations of the mainbeam aperture distribution into the phase shifters 42.

Figure 6B:
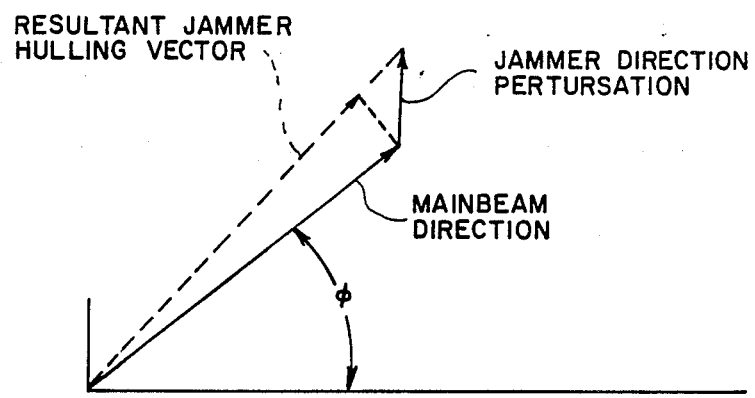
FIG. 6b is a graphic illustration of a typical element vector perturbation for a phased array.
Figure 6A:
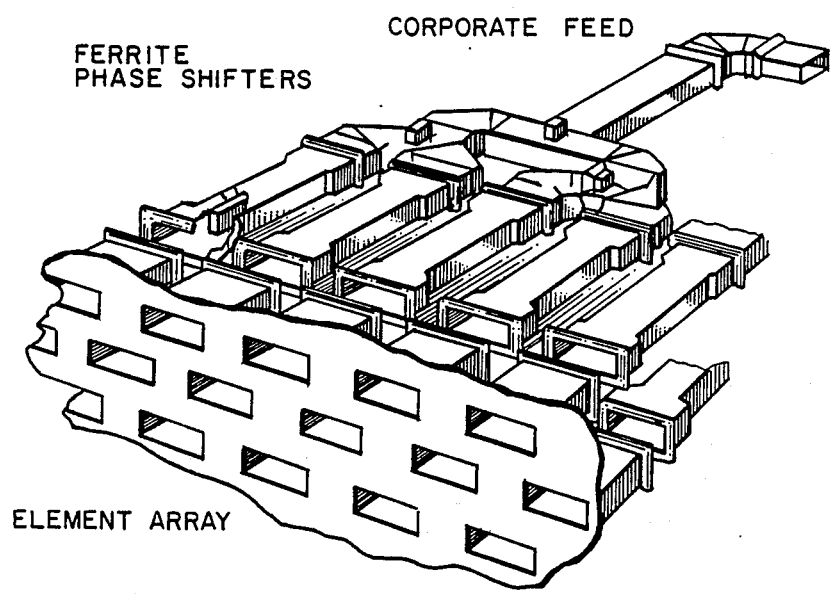
FIG. 6a illustrates a physical model of a phased-array antenna.

A typical element vector perturbation diagram is illustrated in FIG. 6b for a phased-array antenna which utilizes ferrite phase shifters. One may view the perturbation as resulting from superposition of the wavefront for the mainbeam plus a wavefront for the emitter direction. Some basic principles of aperture ripple-modulation effects are described in "An experimental Adaptive null Steering Array Using a Phase-only Pattern Search Algorithm", Proceedings of the Phased Arrays 1985 Symposium, RADC Report TR-85-170, (September 1985), and beamspace decomposition for low-sidelobe phased arrays is described in "Adaptive Sidelobe Nulling Using Digitally Controlled Phase-Shifters," IEEE Trans. Antennas and Prop., AP-24, pp. 638–649, (September 1976).

The small phase (and/or amplitude) perturbations illustrated in FIG. 6b may be injected via several techniques, depending upon the particular type of components and control hardware/software available.

a. The phase shifter itself may permit small analogue vernier control. For example, analogue ferrite phase shifters, or even digital phase shifters in which one of the bits may be perturbed via vernier analogue current drive.

b. If the array contains hundreds or thousands of elements, then the technique of "row/column" averaging may be utilized to get small net phase perturbations in azimuth or elevation, even though the individual phase shifters have only four or five bit control.

c. The addition of a vernier attenuator or phase shifter at each element.

d. The existence of a separate, controlled beamformer coupled into the aperture elements.

The adaptive algorithms needed for adjusting the element weight perturbations are generally known as "search techniques" and they involve utilizing the value of some performance criteria (usually mainbeam output power) to determine the direction of the next perturbation. This class of algorithm is usually characterized by relatively slow convergence speed since individual element direction gradients are not available and must be approximated via time-consuming random trials. However, in the current application where we know the direction of the emitters, their relative power levels, and the mainbeam characteristics, then beamspace decomposition search techniques can steer sidelobe nulls onto the emitter positions with surprising convergence speed.

This technique will be examined in some detail to gain a better perspective of its performance/cost tradeoff characteristics when applied to large aperture phased-array antenna systems.

Section 2 of this disclosure develops the aperture ripple modulation algorithms that were utilized in this investigation; Section 3 discusses simulation results based upon the algorithms; and Section 4 presents some alternate embodiments showing beamspace options for improving performance at the cost of additional DOF.

APERTURE RIPPLE MODULATION ALGORITHMS

The beamspace decomposition discussed by Baird and Rassweiler in "Adaptive Sidelobe Nulling Using Digitally Controlled Phase-Shifters," IEEE Trans. Antennas and Prop., AP-24, pp. 638-649,(Sept. 1976), assumes that the source direction angles are known, whereupon we are essentially working with the simple element vector diagram illustrated in FIG. 6b. This diagram represents the superposition of the element phasing for our quiescent mainbeam wavefront, plus the phasing for each of I emitter small-amplitude wavefronts. Thus, a mathematical expression for the kth element weight, W(k), of a linear array may be written with reference to the vector diagram, $$W(k) = W_q(k)\left[1 + \sum_{i=1}^{I} A_i \exp(\psi_i(k))\right]$$

where
- $W_q(k)$ = quiescent beam kth element weight.
- $A_i$ = amplitude of ith source perturbation.
- $\psi_i(k)$ = phase of ith source perturbation at the kth element.

Further, $\psi_i(k)$ is referenced to the quiescent mainbeam direction element phasing and may be expanded in the form, $$\psi_i(k) = \frac{2\pi d}{\lambda}(\sin\theta_i - \sin\theta_o)\left[k - \left(\frac{K+1}{2}\right)\right] \quad (2)$$

where
- d = element spacing
- λ = wavelength
- K = total number of elements
- $\theta_o$ = quiescent mainbeam steering direction
- $\theta_i$ = direction angle of ith source.

The array elements are assumed to be equally spaced, and all element phasing is referenced to the midpoint or center of the array.

The only unknown quantity in Eqs. (1) and (2) are the coefficients, $A_i$, of the small-amplitude source wavefronts. These are arrived at via a recursive modulation trial and update routine which may be expressed in the form, $$A_i(n + 1) = \left(\frac{\tau(n)}{\tau(n) + 1}\right)A_i(n) + \mu_i(n) \quad (3)$$

where
- $A_i(n)$ = value of $A_i$ used in current trial
- $A_i(n+1)$ = new value of $A_i$ for next trial
- $\mu_i(n)$ = update increment from current trial
- $\tau(n)$ = integration time constant.

Note that the $A_i$ are quantities which are formed by integrating the update increments and that they incorporate a decay factor determined by the time constant, $$\tau(n) = 7.5 + \left(\frac{80}{\sqrt{S(n)}}\right) \quad (4)$$

where S(n)=current trial value of best SNR. The update increments are determined from a weight perturbation modulation trial which involves a simple plus-minus sequence, with the array output power, P(t), monitored and averaged for equal time periods during the modulation trial. The sequence proceeds as follows:

Step 1: If this is a new start, a value of averaged P(t) for unperturbed weights, W is required. Let $\hat{P}_o$ represent that measured average power level. Note that W may be the quiescent mainbeam weights, Wq, if the initial $A_i$ are set to zero for a new start, i.e., refer to Eq. (1).

Step 2: If this is a new start, an initial value for the weight perturbation magnitudes Δi is required. Initial magnitudes are usually chosen about 6 dB below the quiescent beam sidelobe level. For example, if a nominal sidelobe level is −30 dB, then set the initial values of all $\Delta_i$ to equal 0.017 or −36 dB level.

Step 3: The $\Delta_i$ are applied as a weight perturbation modulation in plus-minus sequence for the ith source alone, wherein, $$W_i^+(k) = W(k)[1 + \Delta_i \exp(\psi_i(k))] \quad (5)$$

and $$W_i^-(k) = W(k)[1 - \Delta_i \exp(\psi_i(k))] \quad (6)$$

where $\psi_i(k)$ was given in Eq. (2). The output power is monitored for this sequence, giving two averaged power levels, $P_i(+)$ = averaged P(t) for $W_i^+$ weights.

$P_i(-)$ = averaged P(t) for $W_i^-$ weights.

Note that it is the phase term, $\psi_i(k)$, that confines the modulation to a particular source, thus an adding and subtracting of a low-level beam pointed in the direction of the ith source alone occurs. This is a beamspace low-level modulation technique.

Step 4: Determine best $\Delta_i$ from the modulation trial of step 3 above. The following logic procedure is used in a Fortran IV software program:

F=0
IF ($\hat{P}_i(+) > \hat{P}_o$). AND. ($\hat{P}_i(-) > P_o$) F=1; set flag
IF (F=1) GO TO 33; source in null, don't change u=+1
X=P̂ᵢ(+)−P̂ᵢ(−); modulation difference in power level
  IF (X>0) GO TO 10
  Z=P̂ₒ/P̂ᵢ(+); power level change ratio
  Pₒ=P̂ᵢ(+); P̂ₒ ratchet-down to lowest power level
  GO TO 15
  u=−1
  Z=P̂ₒ/P̂ᵢ(−); power level change ratio
  Pₒ=P̂ᵢ(−); P̂ₒ ratchet-down to lowest power level
  μᵢ(n)=u * Δᵢ; retain the best Δ₁
  S(n)=P̂ₒ/Nₒ; current best SNR
  τ(n)=7.5+(80/√S(n) ); New time constant with a new value for $\mu_i(n)$ and $\tau(n)$ coefficient $A_i(n)$ can be updated per Eq. (3) and hence W(k) per Eq. (1).

Step 5: The magnitudes of the $\Delta_i$ do not remain constant. They must diminish as the output power level $P_o$ is driven toward receiver noise level, because otherwise the modulation perturbations would overdrive the desired null conditions and result in poor convergence behavior. The following logic procedure is used to continue from Step 4 above.

X=7.5/τ(n); dependence upon current best SNR
  Y=10 * ALOG10 (Z); power level in dB
  B=10/(Y+10); dependence upon power level drop
  Q=0.022 * X *B; maximum allowable value
  DO 20, J=1,I
  IF (Q>Δⱼ) GO TO 20
  Δⱼ=Q; reset Δᵢ to new lower value
  CONTINUE Note that since $\hat{P}_o$ depends upon all source nulling, then all $\Delta_i$ are set equal except for retention of a smaller prior value. This permits a ratchet-down convergence behavior.

Step 6: If a given source happens to already be in a sidelobe null, then the flag (F=1) set in Step 4 is used to by-pass any change in the $A_i$ coefficients of Eq. (1) and (3). However, the modulation magnitude, $\Delta_i$, for that particular source is reduced recursively to a very small value, essentially deleting it from the processing. The Fortran IV software logic statement entered from Step 4 is as follows:

33 IF (F=1)Δᵢ=0.5 * Δᵢ+0.00035

In this statement, the value of $\Delta_i$ is reduced by 6 dB on each flag (F=1) recursion, reaching an ultimate minimum of −63 dB if the source continues to remain in a side lobe null.

Step 7: If a given emitter happens to turn off, this would be detected by the source tracking/estimation subsystem, and it would soon be deleted from the high-priority source directory kept in memory. Thus, no further beam modulations would be made in its direction.

Modifications For Phase-Only Nulling

The algorithm described above incorporates both amplitude and phase in the weight perturbations and will result in the best overall nulling performance. However, most phased array applications would require restriction of the perturbations to phase-only changes, so the necessary modifications will be described here.

First, with reference to the vector diagram of FIG. 6b, only the phase angle change is applicable such that Eq. (1) becomes, $$W(k) = W_q(k)\left[1 + j\sum_{i=1}^{I} A_i \sin(\psi_i(k))\right] \quad (7)$$

where it is noted that only the imaginary part of the $A_i$ terms is utilized. This makes it possible to understand the interesting phenomenon of unwanted "symmetrical lobes" which appear in phase-only modulation, because the following trigonometric identity can be substituted into Eq. (7), $$j\sin(\psi_i(k)) = \tfrac{1}{2}[e^{j\psi_i(k)} - e^{-j\psi_i(k)}] \quad (8)$$

Obviously, two lobes will be located at $\pm\psi_i(k)$, and from Eq. (2) it is determined that they will be symmetrical with respect to the pointing direction of the mainbeam. An example pattern plot of such lobes is discussed below in Section 3.

Equations (2) thru (4) remain unchanged, but in Step 2 it is necessary to double the initial value for the weight perturbation magnitudes, $\Delta_1$. For the example given, all $\Delta_i$ are set to 0.034 or −30 dB level. The reason for doubling is that phase-only modulation is roughly half as effective as the combined amplitude plus phase.

In Step 3, the phase angle restriction is again encountered such that Eqs. (5) and (6) become, $$W_i^+(k) = W(k)[1 + j\Delta_i \sin(\psi_i(k))] \quad (9)$$

$$W_i^-(k) = W(k)[1 - j\Delta_i \sin(\psi_i(k))] \quad (10)$$

Steps 4 and 5 remain the same, but in Step 6 the minimum modulation value for the flag (F=1) condition is again doubled,

33 IF (F=1)Δᵢ=0.5*Δᵢ+0.0007 such that the ultimate minimum value is now −57 dB if the source continues to remain in a sidelobe null.

Other Algorithms

The above algorithm is a beamspace, single-cycle, plus-minus, perturbation sequence technique which utilizes the changes in smoothed/averaged output power. There are also other algorithms/techniques described in the literature which would be suitable for this application. For example, the orthogonal binary code sequences described by Cantoni and Godara in "Analysis of the Performance of Adaptive Beamforming Using Perturbation Sequences," IEEE Trans. Antennas Prop., Vol AP-31, pp. 268–279, (March 1983) could be adapted to the present situation, where it should be noted that they correlate the instantaneous output power with their sequences rather than the smoothed output power. Also, the coherent perturbation algorithm work of Davis et al in "A Coherent Perturbation Algorithm," IEEE Trans. Antennas Prop., Vol. AP-34, pp. 380–387, (March 1986) should be applicable.

SIMULATION RESULTS FROM APERTURE RIPPLE ALGORITHM

Figure 7A:
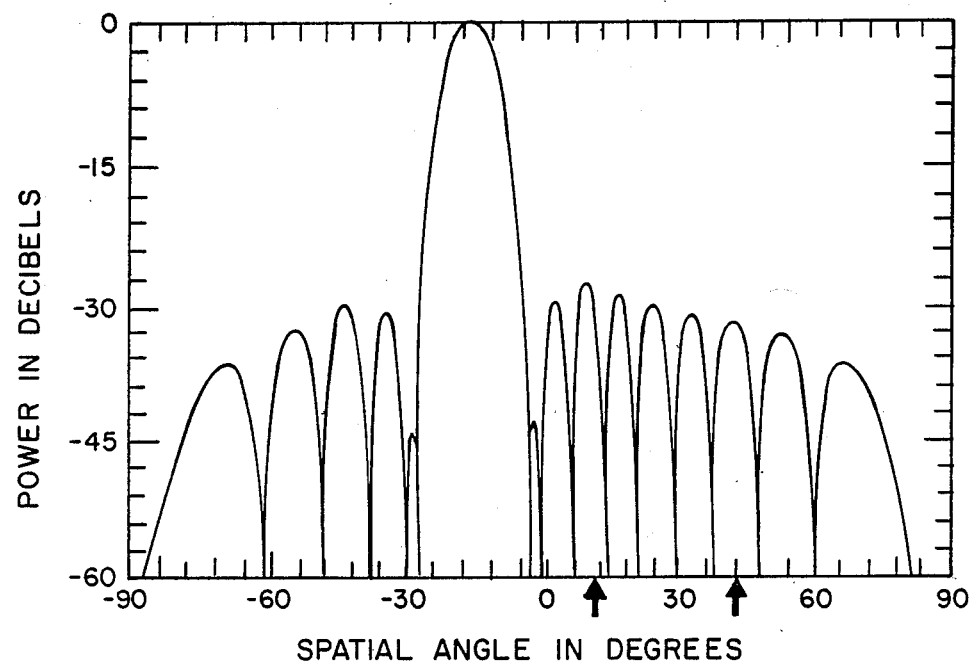
FIG. 7a is a graphic illustration of a quiescent mainbeam pattern for a 16 element linear array having two 46 DB sources at ten and forty-two degrees.
Figure 7B:
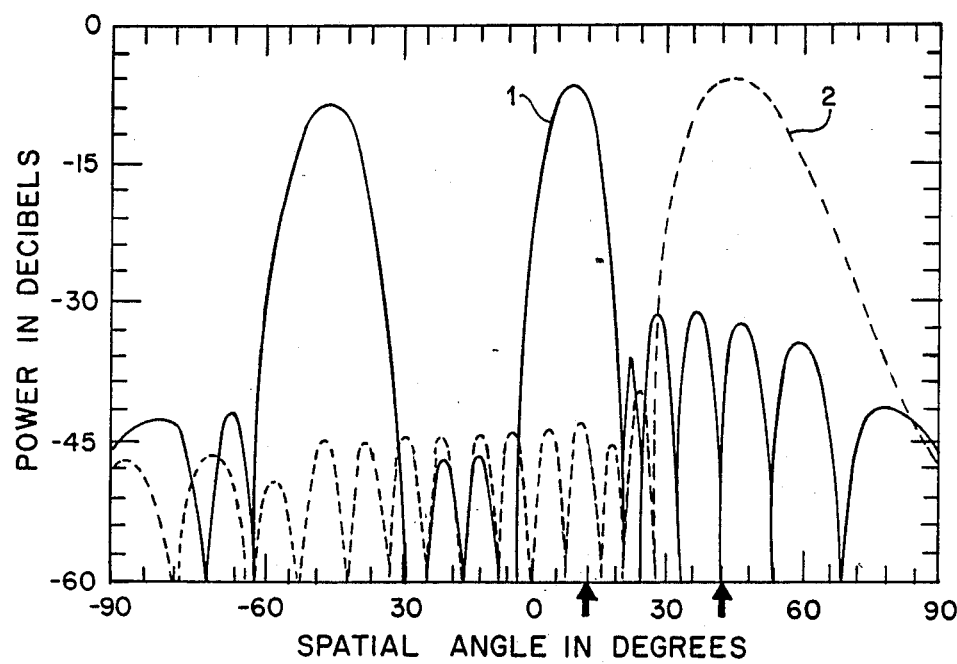
FIG. 7b is a graphic illustration of an aperture ripple-modulation beam for a 16 element linear array having two 46 DB sources at ten and forty-two degrees resulting from phase-only perturbations.

In this section performance results obtained by applying the algorithms of Section 2 to computer simulated source situations are described. FIG. 7(a) illustrates an example showing two rather strong emitters of 46 dB signal-to-noise (SNR) located in the sidelobe region of a 16-element linear array with half-wavelength element spacing and a 30 dB Taylor illumination. The sources are non-coherent and swept in frequency over a 5 percent RF bandwidth. Since the directions of the sources are known, phase perturbations are applied across the array to generate two beams in those directions. FIG. 7(b) illustrates pattern plots of the two beams, labelled 1 and 2, where it should be noted that these 14 beams are the result of phase-only perturbation. The beams have good sidelobe level because they automatically incorporate the 30 dB Taylor illumination taper, but they are also subject to the appearance of unwanted "symmetrical lobes" because of the phase-only approximation discussed in Section 2 above.

The symmetrical lobe appears on the opposite side of the mainbeam, i.e., the mainbeam pointing direction is the point of symmetry as may be seen in FIG. 7 for the No. 1 beam. Note in FIG. 7b that the symmetrical lobe for the No. 2 beam does not appear in visible space because it is too far beyond the mainbeam direction. If the perturbation were to incorporate both amplitude and phase, then the unwanted symmetrical lobes would not be formed.

As discussed in Section 2, above, the search algorithm applies a starting perturbation magnitude level which is roughly equal to the mainbeam sidelobe level and monitors the averaged power output for a plus-minus sequence modulation. If the power output drops below the $P_o$ level measured on the previous trial, that perturbation is retained and the value of $P_o$ is reset to the new lower level. The resultant "ratchet-down" effect on the output power level is shown in FIG. 8a, where it will be noted that convergence occurs in about 600 snapshots for this case.

A "snapshot" is equivalent to the element data contained in one range bin, sampled simultaneously across the array. In FIG. 8a, the dot symbol "." denotes the instantaneous power output of the mainbeam from each snapshot; the clusters of "+" symbols denote an average of the instantaneous power taken over the previous 21 snapshots, and they clearly identify the $P_i(+)$ and $P_i(-)$ power levels associated with a given weight perturbation; the horizontal line symbols "_" denote the unperturbed average power level, $P_o$ from the previous plus-minus perturbation sequence; and the heavy dashed-line has been added to indicate the approximate convergence of the average output power level down to receiver noise level (0 dB).

Figure 8A:
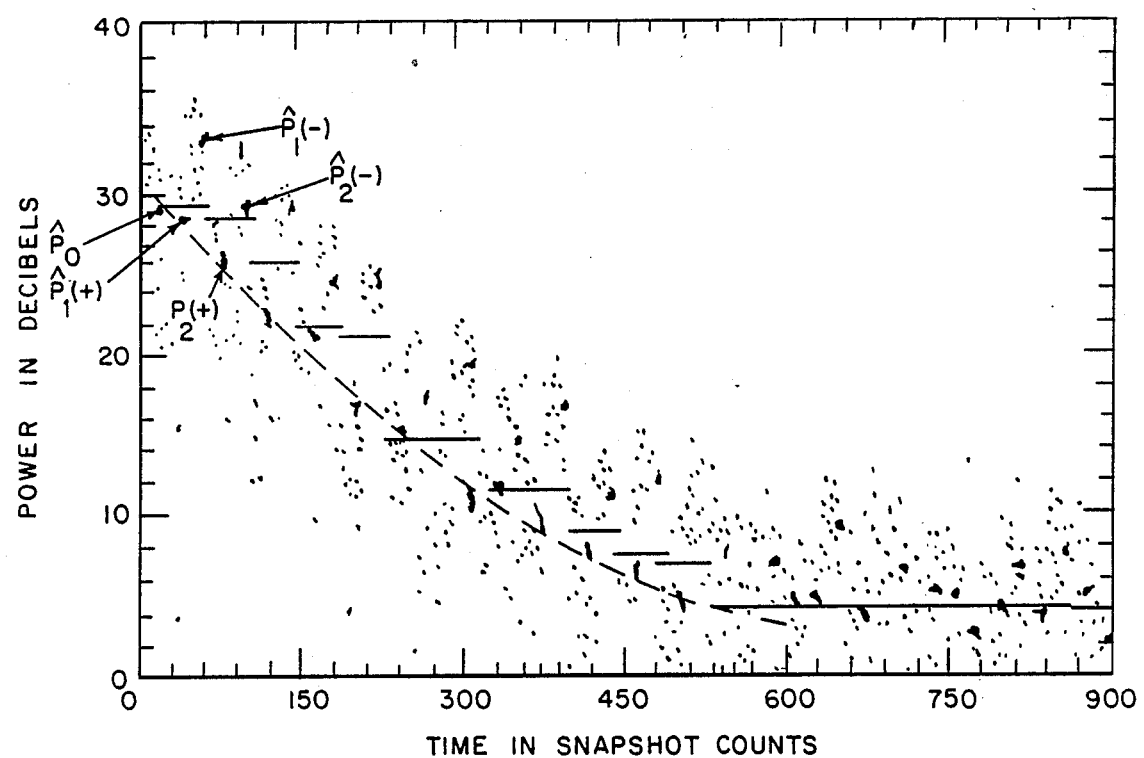
FIG. 8a is a graphic illustration of the convergence response performance for beamspace, single-cycle, plus-minus perturbation sequence search algorithm using phase-only perturbations, processed for the two-source case of FIGS. 7a and 7b.

The first complete plus-minus sequence indicated in FIG. 8a follows. Starting from the left, the initial new start $\hat{P}_o$ unperturbed level is about 29.5 dB. The first plus-minus cycle is then directed toward source No. 1 located at +10 degrees azimuth, and the resultant power levels are identified as $\hat{P}_1(+)$ at 28.5 dB and $\hat{P}_1(-)$ at 33.5 dB, from which the (+) perturbation is retained and $\hat{P}_o$ is reset to equal $\hat{P}_1(+)$ at 28.5 dB. The second plus-minus cycle is then directed toward source No. 2 located at +42 degrees azimuth, and the resultant power levels are identified as at $\hat{P}_1(+)$ at 26 dB and $\hat{P}_2(-)$ at 29 dB, from which the (+) perturbation is retained and $\hat{P}_0$ is reset to equal $\hat{P}_2(+)$ at 26 dB. The sequence is then repeated until the output converges close to receiver noise power level.

Figure 8B:
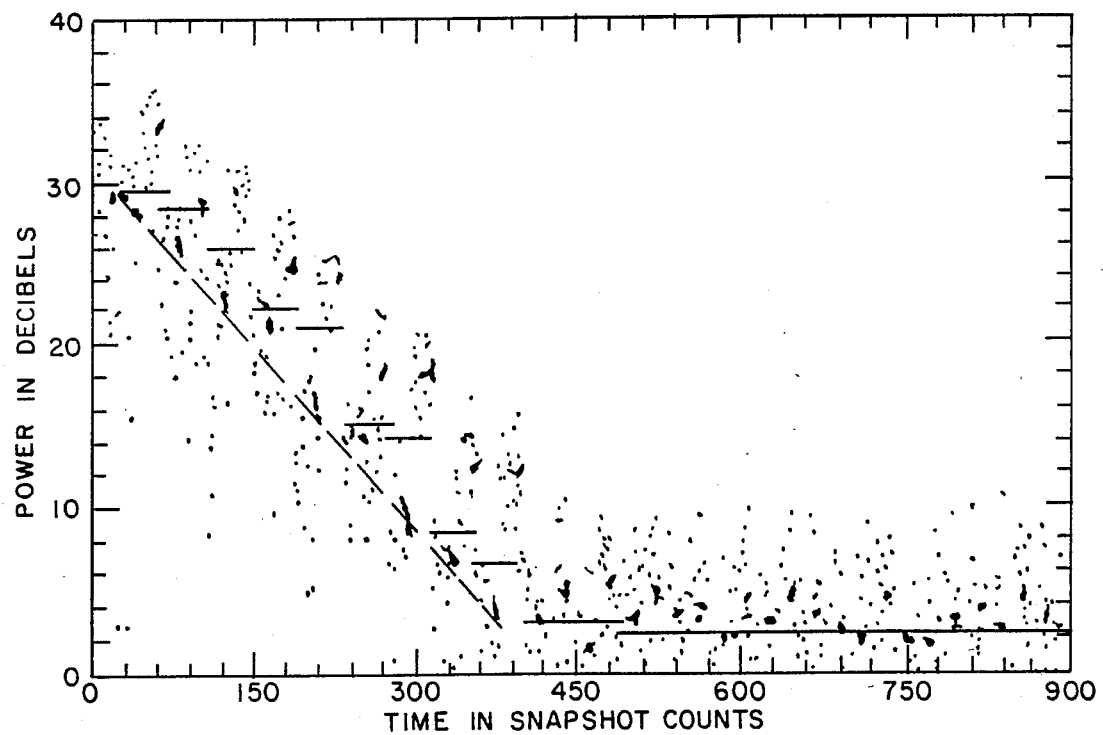
FIG. 8b is a graphic illustration of the convergence response performance for beamspace, single-cycle, plus-minus perturbation sequence search algorithm using amplitude and phase weight perturbations, processed for the two-source case of FIGS. 7a and 7b.

FIG. 8b illustrates the somewhat faster convergence obtained when the perturbations incorporate both amplitude and phase.

Figure 9:
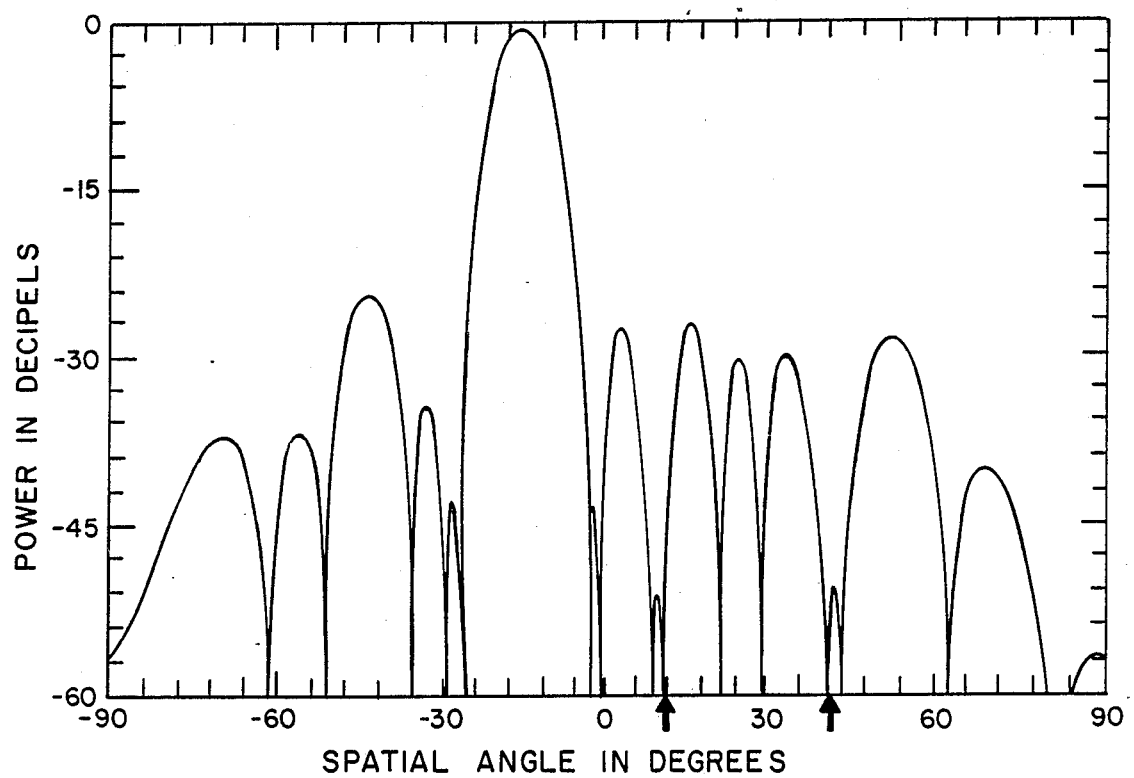
FIG. 9 is a graphic illustration of an adapted pattern after convergence for the two-source case of FIGS. 7a and 7b.

FIG. 9 shows a typical adapted pattern after convergence. The adapted pattern remains quite stable and has successfully nulled out both sources. A modest increase in a sidelobe can be seen on the left side of the mainbeam at about −44 degrees, which is the exact position of the unwanted symmetrical lobe discussed in FIG. 7b.

ALTERNATE EMBODIMENTS

Figure 10:
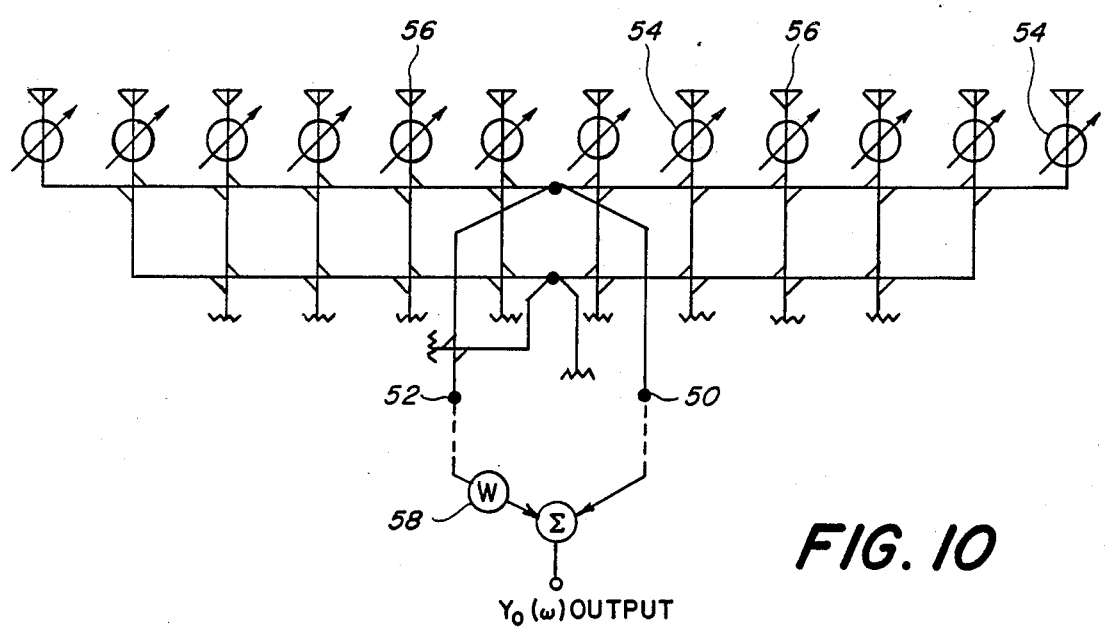
FIG. 10 is a schematic diagram of a typical monopulse sum and difference beamformer network, with an adaptive weight option added for using the difference beam as an auxiliary beam.

Thus far, only the most simple configuration has been considered wherein there is just one mainbeam output port to work with. In this section, the concept of having additional output beam ports available will be discussed. For example, in FIG. 10, a phased array antenna system having monopulse tracking capability with both a sum ($\Sigma$) output port 50 and a difference ($\Delta$) output port 52 is shown. The system includes several phase shifters 54 and corresponding array elements 56. This constitutes a distinct advantage for the simple adaptive system in that the availability of any extra beam port essentially gives an auxiliary beam, i.e. an extra degree-of-freedom (DOF). There are several different ways for improving the adaptive performance.

First, the aperture ripple modulation technique of Section 2 could be applied separately to the $\Sigma$ and $\Delta$ beams. This would require superposition of the two modulations at each element weight, but the fact that the $\Sigma$ and $\Delta$ beams are orthogonal (or nearly so) should permit the technique to develop overlapping nulls in the two patterns. Alternatively, we could work with the two halves of the array, before the signals are combined into the $\Sigma$ and $\Delta$ channels. The ramifications of simultaneous nulling in the $\Sigma$ and $\Delta$ channels are discussed by Haupt in "Simultaneous Nulling in the Sum and Difference Patterns of a Monopulse Antenna," IEEE Trans. Antennas Prop., Vol AP-32, pp. 486–493, (May 1984).

Second, by reserving the $\Delta$ beam for use as an auxiliary canceller beam, the steering of a low-level lobe toward an emitter can be separated from the adaptive weight 58 needed to subtract it from the $\epsilon$ beam. This option is indicated by the dashed-line configuration in FIG. 10, and it would have the advantage of very fast cancellation for a single interference source. Disadvantages to this option include some rather large changes in the resultant adapted pattern; not only would there be sidelobe perturbations in the vicinity of the emitter, but the mainlobe would suffer some distortion due to subtracting the $\Delta$ beam from it. This option results in the interesting phenomenon that a "$\Sigma$ type" of ripple beam would exist in the $\Delta$ channel, and a "$\Delta$ type" of ripple beam would exist in the $\Sigma$ channel.

Figure 11:
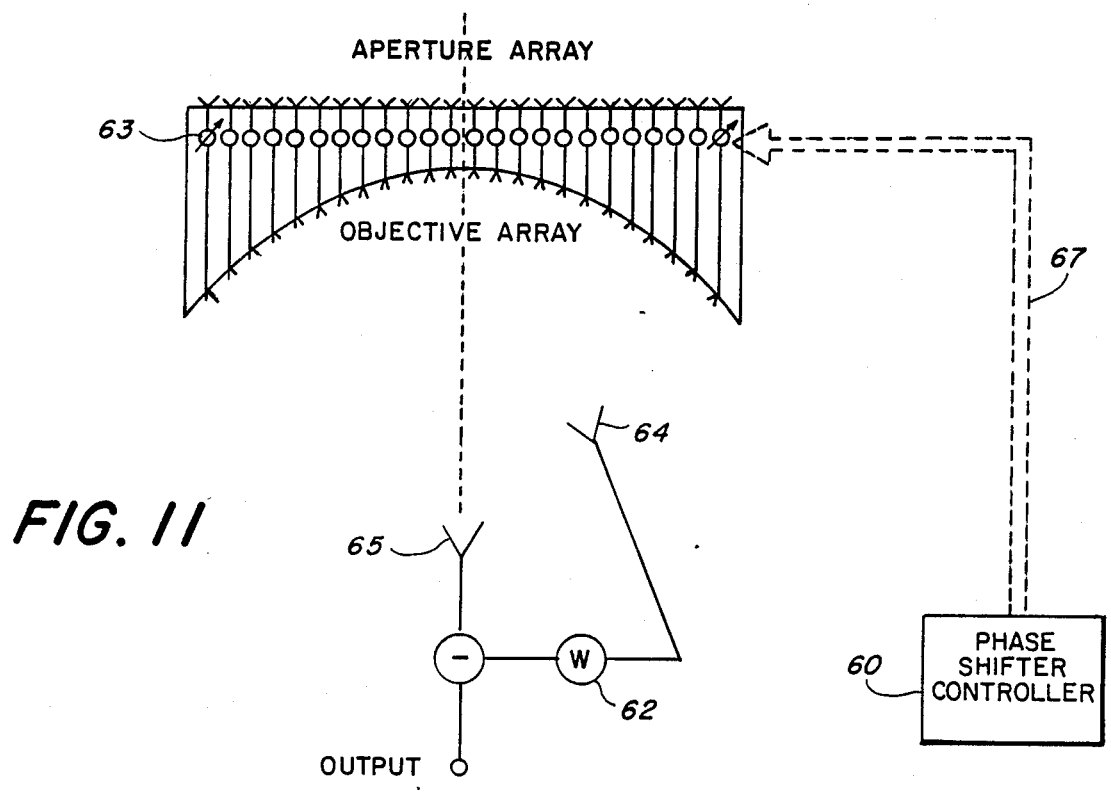
FIG. 11 is a schematic diagram of a space-fed lens configuration utilizing off-axis, defocussed feed to obtain an auxiliary beam for sidelobe nulling.

FIG. 11 illustrates a phased array antenna system consisting 12 of a space-fed lens in which the mainbeam is scanned by phase-shifters 63 located in the objective lens. The system utilizes a mainbeam feed 65 and a de-focussed feed 64. The option of using the off-axis, de-focused feed 64 as an auxiliary beam is considered. The possibility here is that aperture ripple modulation could be utilized to focus the de-focused feed 64 onto an emitter, and then adaptively weight its output by the adaptive weight 62 to cancel the interference from the mainbeam. A phase shifter controller 60 is connected to the phase shifters 63 by line 67 for aperture ripple injection. Again, this configuration would have the advantage of separating the steering of a low-level lobe from its adaptive weight, and could achieve very fast cancellation of the interference source. Some deterioration in the resultant adapted pattern sidelobes should be expected because of the double de-focused aperture ripple, and the de-focused feed will have some sort of major lobe caused by "looking thru" the mainbeam focusing. This "major lobe" will appear in the sidelobes of the resultant adapted pattern. Linear superposition allows one to add several de-focused feeds to this type of phased array system, thus making it amenable to very fast adaptive response with several DOF.

Several simple phase-shifter nulling techniques have been investigated for application to large-aperture phased arrays. The intended purpose is to provide a modest partial adaptive capability at reasonable cost. These techniques depend upon having access to the array element phase shifters for injection of small phase (and/or amplitude) perturbations of the mainbeam aperture distribution, but they do not require any auxiliary elements or correlators or beam-formers. A key factor to their successful operation is apriori knowledge of the directions/locations of emitter sources to be nulled out, and this must be provided for either by mainbeam tracking of the sources or a separate source estimation processor subsystem.

A complete description has been given for the particular aperture ripple modulation algorithms utilized, based upon beamspace decomposition and adaptive "search" techniques. These algorithms were then applied to a computer simulated source situation involving two strong non-coherent emitters which were swept in frequency over a 5 percent bandwidth. Both sources were nulled out within about 600 snapshots of data, which is remarkably fast convergence for such a simple phase-only adaptive system. Some additional beamspace options were also described, which would permit improvements in adaptive performance if additional degrees-of-freedom were available.

Obviously, many other modifications and variations of the present invention are possible in light of the above teachings. It is therefore understood that within the scope of the appended claims, the invention may be practiced otherwise than as specifically described.

What is claimed and desired to be secured by Letters Patent of the United States is:

1. A method of nulling out interference sources in a large-aperture phased-array radar system having a plurality of phase shifters, apriori knowledge of the direction of interference sources, one mainbeam output port and access to the array element phase shifters, said method comprising the steps of:
   determining the directions of the interfering sources to be nulled out;
   determining an adaptive weight W(k) for each antenna element of said phased array, said adaptive weight being represented by:

$$W(k) = W_q(k)\left[1 + j\sum_{i=1}^{I} A_i \sin(\psi_i(k))\right]$$

wherein
   $W_q(k)$ = quiescent beam kth element weight,
   $A_i$ = amplitude of ith source perturbation,
   $\psi_i(k)$ = phase of ith source perturbation at the kth element, wherein $\psi_i(k) = \frac{2\pi d}{\lambda}(\sin\theta_i - \sin\theta_0)\left[k - \left(\frac{K+1}{2}\right)\right]$, where
   d = element spacing,
   $\lambda$ = wavelength,
   K = total number of elements,
   $\theta_0$ = quiescent mainbeam steering direction, and
   $\theta_i$ = direction angle of ith source;
   determining coefficient $A_i$ via a recursive modulation trial and update routing expressed in the form:

$$A_i(n+1) = \left(\frac{\tau(n)}{\tau(n)+1}\right)A_i(n) + \mu_i(n)$$

where
   $A_i(n)$ = value of $A_i$ used in current trial,
   $A_i(n+1)$ = value of $A_i$ for next trial,
   $\mu_i(n)$ = update increment from current trial,
   $\tau(n)$ = integrating time constant, wherein $$\tau(n) = 7.5 + \left(\frac{80}{\sqrt{s(n)}}\right),$$

and S(n) = current trial value of best SNR;
   determining the update increments from a weight perturbation modulation trial with the array output power P(t), being monitored and averaged for equal time periods during the modulation trial according to the following steps:
   (1) establishing an initial value of averaged P(t) for unperturbed weight W(k),
   (2) establishing an initial value for the weight perturbation magnitude $\Delta_i$,
   (3) applying the $\Delta_i$ as a weight perturbation modulation in plus-minus sequence for the i(th) source above wherein
   $W_i^+(k) = W(k)[1 + j\Delta_i \sin(\psi_i(k))]$ and
   $W_i^-(k) = W(k)[1 - j\Delta_i \sin(\psi_i(k))]$;
   (4) monitoring P(t) during sequence 3 above giving two corresponding averaged output power levels
   $P_i(+)$ = averaged P(t) for $W_i^+$ weights and
   $P_i(-)$ = averaged P(t) for $W_i^-$ weights;
   (5) determining the best $\Delta_i$ from sequence 3 above;
   (6) Updating $A_i(n)$ and W(k) with the updated values of $\mu_i(n)$ and $\tau(n)$;
   injecting phase perturbations into a mainbeam aperture distribution via accessible phase shifters.

2. A method of nulling out interference sources in a large-aperture phased-array radar system having a plurality of phase shifters, apriori knowledge of the direction of interference sources, one mainbeam output port and access to the array element phase shifters, said method comprising the steps of:
   determining the directions of the interfering sources to be nulled out;
   determining an adaptive weight w(k) for each antenna element of said phased array, said adaptive weight being represented by:

$$W(k) = W_q(k)\left[1 + \sum_{i=1}^{I} A_i \exp(\psi_i(k))\right]$$

wherein
   $W_q(k)$ = quiescent beam kth element weight,
   $A_i$ = amplitude of ith source perturbation,
   $\psi_i(k)$ = phase of ith source perturbation at the kth element, wherein $\psi_i(k) = \frac{2\pi d}{\lambda} (\sin \theta_i - \sin \theta_0) \left[ k - \left( \frac{K+1}{2} \right) \right]$, where
d = element spacing,
λ = wavelength,
K = total number of elements,
$\theta_0$ = quiescent mainbeam steering direction, and
$\theta_i$ = direction angle of ith source;

determining coefficient $A_i$ via a recursive modulation trial and update routing expressed in the form:

$$A_i(n+1) = \left( \frac{\tau(n)}{\tau(n)+1} \right) A_i(n) + \mu_i(n)$$

where
$A_i(n)$ = value of $A_i$ used in current trial,
$A_i(n+1)$ = value of $A_i$ for next trial,
$\mu_i(n)$ = update increment from current trial,
$\tau(n)$ = integrating time constant, wherein $$\tau(n) = 7.5 + \left( \frac{80}{\sqrt{s(n)}} \right),$$

and S(n) = current trial value of best SNR;

determining the update increments from a weight perturbation modulation trial with the array output power P(t), being monitored and averaged for equal time periods during the modulation trial according to the following steps:
(1) establishing an initial value of averaged P(t) for unperturbed weight W(k),
(2) establishing an initial value for the weight perturbation magnitude $\Delta_i$,
(3) applying the $\Delta_i$ as a weight perturbation modulation in plus-minus sequence for the i(th) source above wherein
$W_i^+(k) = W(k)[1 + \Delta_i \exp(\psi_i(k))]$ and
$W_i^-(k) = W(k)[1 - \Delta_i \exp(\psi_i(k))]$;
(4) monitoring P(t) during sequence 3 above giving two corresponding averaged output power levels
$P_i(+)$ = averaged P(t) for $W_i^+$ weights and
$P_i(-)$ = averaged P(t) for $W_i^-$ weights;
(5) determining the best $\Delta_i$ from sequence 3 above;
(6) Updating $A_i(n)$ and W(k) with the updated values of $\mu_i(n)$ and $\tau(n)$;
injecting phase and amplitude perturbations into a mainbeam aperture distribution via accessible phase and amplitude devices.

3. A method of nulling out interference sources in a monopulse large-aperture phased array radar system having both a sum and a difference port, and apriori knowledge of said interference sources and access to the array element phase shifters, said method comprising the steps of:
determining the directions of the interfering sources to be nulled out;
determining an adaptive weight w(k) for each antenna element of said phased array, said adaptive weight being represented by:

$$W(k) = W_q(k) \left[ 1 + j \sum_{i=1}^{I} A_i \sin(\psi_i(k)) \right]$$

wherein
$W_q(k)$ = quiescent beam kth element weight,
$A_i$ = amplitude of ith source perturbation,
$\psi_i(k)$ = phase of ith source perturbation at the kth element, wherein $\psi_i(k) = \frac{2\pi d}{\lambda} (\sin \theta_i - \sin \theta_0) \left[ k - \left( \frac{K+1}{2} \right) \right]$, where
d = element spacing,
λ = wavelength,
K = total number of elements,
$\theta_0$ = quiescent mainbeam steering direction, and
$\theta_i$ = direction angle of ith source;

determining coefficient $A_i$ via a recursive modulation trial and update routing expressed in the form:

$$A_i(n+1) = \left( \frac{\tau(n)}{\tau(n)+1} \right) A_i(n) + \mu_i(n)$$

where
$A_i(n)$ = value of $A_i$ used in current trial,
$A_i(n+1)$ = value of $A_i$ for next trial,
$\mu_i(n)$ = update increment from current trial,
$\tau(n)$ = integrating time constant, wherein $$\tau(n) = 7.5 + \left( \frac{80}{\sqrt{s(n)}} \right),$$

and S(n) = current trial value of best SNR;

determining the update increments from a weight perturbation modulation trial with the array output power P(t), being monitored and averaged for equal time periods during the modulation trial according to the following steps:
(1) establishing an initial value of averaged P(t) for unperturbed weight W(k),
(2) establishing an initial value for the weight perturbation magnitude $\Delta_i$,
(3) applying the $\Delta_i$ as a weight perturbation modulation in plus-minus sequence for the i(th) source above wherein
$W_i^+(k) = W(k)[1 + j\Delta_i \sin(\psi_i(k))]$ and
$W_i^-(k) = W(k)[1 - j\Delta_i \sin(\psi_i(k))]$;
(4) monitoring P(t) during sequence 3 above giving two corresponding averaged output power levels
$P_i(+)$ = averaged P(t) for $W_i^+$ weights and
$P_i(-)$ = averaged P(t) for $W_i^-$ weights;
(5) determining the best $\Delta_i$ from sequence 3 above;
(6) Updating $A_i(n)$ and W(k) with the updated values of $\mu_i(n)$ and $\tau(n)$;
injecting phase perturbations separately into the sum and difference beams.

4. A method of nulling out interference sources in a monopulse large-aperture phased array radar system having both a sum and a difference port, and apriori knowledge of said interference sources and access to the array element phase shifters, said method comprising the steps of:

determining the directions of the interfering sources to be nulled out;

determining an adaptive weight W(k) for each antenna element of said phased array, said adaptive weight being represented by:

$$W(k) = W_q(k)\left[1 + \sum_{i=1}^{I} A_i \exp(\psi_i(k))\right]$$

wherein
$W_q(k)$ = quiescent beam kth element weight,
$A_i$ = amplitude of ith source perturbation,
$\psi_i(k)$ = phase of ith source perturbation at the kth element, wherein $\psi_i(k) = \frac{2\pi d}{\lambda} (\sin \theta_i - \sin \theta_0)\left[k - \left(\frac{K+1}{2}\right)\right]$, where
d = element spacing,
λ = wavelength,
K = total number of elements,
$\theta_0$ = quiescent mainbeam steering direction, and
$\theta_i$ = direction angle of ith source;
determining coefficient $A_i$ via a recursive modulation trial and update routing expressed in the form:

$$A_i(n + 1) = \left(\frac{\tau(n)}{\tau(n) + 1}\right) A_i(n) + \mu_i(n)$$

where
$A_i(n)$ = value of $A_i$ used in current trial,
$A_i(n+1)$ = value of $A_i$ for next trial,
$\mu_i(n)$ = update increment from current trial,
$\tau(n)$ = integrating time constant, wherein $$\tau(n) = 7.5 + \left(\frac{80}{\sqrt{s(n)}}\right),$$

and S(n) = current trial value of best SNR;
determining the update increments from a weight perturbation modulation trial with the array output power P(t), being monitored and averaged for equal time periods during the modulation trial according to the following steps:
(1) establishing an initial value of averaged P(t) for unperturbed weight W(k),
(2) establishing an initial value for the weight perturbation magnitude $\Delta_i$,
(3) applying the $\Delta_i$ as a weight perturbation modulation in plus-minus sequence for the i(th) source above wherein
$W_i^+(k) = W(k) [1 + \Delta_i \exp(\psi_i(k))]$ and
$W_i^-(k) = W(k) [1 - \Delta_i \exp(\psi_i(k))]$;
(4) monitoring P(t) during sequence 3 above giving two corresponding averaged output power levels
$P_i(+)$ = averaged P(t) for $W_i^+$ weights and
$P_i(-)$ = averaged P(t) for $W_i^-$ weights;
(5) determining the best $\Delta_i$ from sequence 3 above;
(6) Updating $A_i(n)$ and W(k) with the updated values of $\mu_i(n)$ and $\tau(n)$;

injecting both phase and amplitude perturbations into both the sum and difference beams.

5. A method of nulling out interference sources in a large-aperture phased-array radar system which includes a space-fed lens in which a mainbeam is scanned by phase-shifters located in an objective lens, said method comprising the steps of:

determining the directions of the interfering sources to be nulled out;
using an off-axis de-focused feed as an auxiliary beam, and applying aperture ripple modulation to focus the de-focused feed onto an emitter; and
adaptively weighting an output of said de-focused feed to cancel interference from the mainbeam.

6. A large-aperture, phased-array radar system for nulling out interference sources, said system having apriori knowledge of said interference sources, and one mainbeam output port and access to array element phase shifters, comprises:

means for determining the directions of the sources to be nulled out;
means for determining an adaptive weight W(k) for each antenna element of said phased array, said adaptive weight being represented by:

$$W(k) = W_q(k)\left[1 + j\sum_{i=1}^{I} A_i \sin(\psi_i(k))\right]$$

wherein
$W_q(k)$ = quiescent beam kth element weight,
$A_i$ = amplitude of ith source perturbation,
$\psi_i(k)$ = phase of ith source perturbation at the kth element, wherein $\psi_i(k) = \frac{2\pi d}{\lambda} (\sin \theta_i - \sin \theta_0)\left[k - \left(\frac{K+1}{2}\right)\right]$, where
d = element spacing,
λ = wavelength,
K = total number of elements,
$\theta_0$ = quiescent mainbeam steering direction, and
$\theta_i$ = direction angle of ith source;
means for determining the coefficient $A_i$ via a recursive modulation trial and update routing expressed in the form:

$$A_i(n + 1) = \left(\frac{\tau(n)}{\tau(n) + 1}\right) A_i(n) + \mu_i(n)$$

where
$A_i(n)$ = value of $A_i$ used in current trial,
$A_i(n+1)$ = value of $A_i$ for next trial,
$\mu_i(n)$ = update increment from current trial,
$\tau(n)$ = integrating time constant, wherein $$\tau(n) = 7.5 + \left(\frac{80}{\sqrt{s(n)}}\right),$$

and S(n) = current trial value of best SNR;
means for determining the update increments from a weight perturbation modulation trial with the array output power P(t), being monitored and averaged for equal time periods during the modulation trial, said means for determining the update increments includes
(1) means for establishing an initial value of averaged P(t) for unperturbed weight W(k),
(2) means for establishing an initial value for the weight perturbation magnitude $\Delta_i$,
(3) means for applying the $\Delta_i$ as a weight perturbation modulation in plus-minus sequence for the i(th) source above wherein
$W_i^+(k) = W(k)[1+j\Delta_i\sin(\psi_i(k))]$ and
$W_i^-(k) = W(k)[1-j\Delta_i\sin(\psi_i(k))]$;
(4) means for monitoring P(t) giving two corresponding averaged output power levels
$P_i(+)$ = averaged P(t) for $W_i^+$ weights and
$P_i(-)$ = averaged P(t) for $W_i^-$ weights;
(5) means for determining the best $\Delta_i$ from sequence 3 above;
(6) means for updating $A_i(n)$ and W(k) with the updated values of $\mu_i(n)$ and $\tau(n)$;
a plurality of phase shifters;
a plurality of phased array elements connected to said plurality of phase shifters;
means for injecting phase perturbations of a mainbeam aperture distribution into said mainbeam aperture.

7. A large-aperture, phased-array radar system for nulling out interference sources, said system having apriori knowledge of said interference sources, and one mainbeam output port and access to array element phase shifters, comprises:
means for determining the directions of the sources to be nulled out;
means for determining an adaptive weight W(k) for each antenna element of said phased array, said adaptive weight being represented by:

$$W(k) = W_q(k)\left[1 + \sum_{i=1}^{I} A_i \exp(\psi_i(k))\right]$$

wherein
$W_q(k)$ = quiescent beam kth element weight,
$A_i$ = amplitude of ith source perturbation,
$\psi_i(k)$ = phase of ith source perturbation at the kth element, wherein $\psi_i(k) = \frac{2\pi d}{\lambda}(\sin\theta_i - \sin\theta_0)\left[k - \left(\frac{K+1}{2}\right)\right]$, where
d = element spacing,
$\lambda$ = wavelength,
K = total number of element,
$\theta_0$ = quiescent mainbeam steering direction, and
$\theta_i$ = direction angle of ith source;
means for determining coefficient $A_i$ via a recursive modulation trial and update routing expressed in the form:

$$A_i(n+1) = \left(\frac{\tau(n)}{\tau(n)+1}\right)A_i(n) + \mu_i(n)$$

where
$A_i(n)$ = value of $A_i$ used in current trial,
$A_i(n+1)$ = value of $A_i$ for next trial,
$\mu_i(n)$ = update increment from current trial,
$\tau(n)$ = integrating time constant, wherein $$\tau(n) = 7.5 + \left(\frac{80}{\sqrt{s(n)}}\right),$$

and S(n) = current trial value of best SNR;
means for determining the update increments from a weight perturbation modulation trial with the array output power P(t), being monitored and averaged for equal time periods during the modulation trial, said means for determining the update increments includes
(1) means for establishing an initial value of averaged P(t) for unperturbed weight W(k),
(2) means for establishing an initial value for the weight perturbation magnitude $\Delta_i$,
(3) means for applying the $\Delta_i$ as a weight perturbation modulation in plus-minus sequence for the i(th) source above wherein
$W_i^+(k) = W(k)[1+\Delta_i\exp(\psi_i(k))]$ and
$W_i^-(k) = W(k)[1-\Delta_i\exp(\psi_1(k))]$;
(4) means for monitoring P(t) giving two corresponding averaged output power levels
$P_i(+)$ = averaged P(t) for $W_i^+$ weights and
$P_i(-)$ = averaged P(t) for $W_i^-$ weights;
(5) means for determining and the $\Delta_i$ from sequence 3 above;
(6) means for updating $A_i(n)$ and W(k) with the updated values of $\mu_i(n)$ and $\tau(n)$;
a plurality of phase shifters;
a plurality of phased array elements connected to said plurality of phase shifters;
means for injecting phase and amplitude perturbations of a mainbeam aperture distribution into said mainbeam aperture.

8. A monopulse, large-aperture, phased-array radar system for nulling out interference sources, said system having apriori knowledge of said interfering sources, and both a sum and a difference port, and access to array element phase shifters, comprises:
means for determining the directions of the sources to be nulled out;
means for determining an adaptive weight W(k) for each antenna element of said phased array, said adaptive weight being represented by:

$$W(k) = W_q(k)\left[1 + j\sum_{i=1}^{I} A_i \sin(\psi_i(k))\right]$$

wherein
$W_q(k)$ = quiescent beam kth element weight,
$A_i$ = amplitude of ith source perturbation,
$\psi_i(k)$ = phase of ith source perturbation at the kth element, wherein $\psi_i(k) = \frac{2\pi d}{\lambda}(\sin\theta_i - \sin\theta_0)\left[k - \left(\frac{K+1}{2}\right)\right]$, where
d = element spacing.
$\lambda$ = wavelength,
K = total number of element, $\theta_0$=quiescent mainbeam steering direction, and
$\theta_i$=direction angle of ith source;
means for determining coefficient $A_i$ via a recursive modulation trial and update routing expressed in the form:

$$A_i(n + 1) = \left(\frac{\tau(n)}{\tau(n) + 1}\right) A_i(n) + \mu_i(n)$$

where
$A_i(n)$=value of $A_i$ used in current trial,
$A_i(n+1)$=value of $A_i$ for next trial,
$\mu_i(n)$=update increment from current trial,
$\tau(n)$=integrating time constant, wherein $$\tau(n) = 7.5 + \left(\frac{80}{\sqrt{S(n)}}\right),$$

and $S(n)$=current trial value of best SNR;
means for determining the update increments from a weight perturbation modulation trial with the array output power P(t), being monitored and averaged for equal time periods during the modulation trial, said means for determining the update increments includes
(1) means for establishing an initial value of averaged P(t) for unperturbed weight W(k),
(2) means for establishing an initial value for the weight perturbation magnitude $\Delta_i$,
(3) means for applying the $\Delta_i$ as a weight perturbation modulation in plus-minus sequence for the i(th) source above wherein
$W_i^+(k) = W(k) [1 + j\Delta_i \sin(\psi_i(k))]$ and
$W_i^-(k) = W(k) [1 - j\Delta_i \sin(\psi_i(k))]$;
(4) means for monitoring P(t) giving two corresponding averaged output power levels
$P_i(+)$=averaged P(t) for $W_i^+$ weights and
$P_i(-)$=averaged P(t) for $W_i^-$ weights;
(5) means for determining the best $\Delta_i$ from sequence 3 above;
(6) means for updating $A_i(n)$ and W(k) with the updated values of $\mu_i(n)$ and $\tau(n)$;
a plurality of phase shifters;
a plurality of phased array elements connected to said plurality of phase shifters; and
means for injecting phase perturbations of a mainbeam aperture distribution, into the sum and difference beams.

9. A monopulse, large-aperture, phased-array radar system for nulling out interference sources, said system having apriori knowledge of said interfering sources, and both a sum and a difference port, and access to array element phase shifters, comprises:
means for determining the directions of the sources to be nulled out;
means for determining an adaptive weight W(k) for each antenna element of said phased array, said adaptive weight being represented by:

$$W(k) = W_q(k) \left[1 + \sum_{i=1}^{I} A_i \exp(\psi_i(k))\right]$$

wherein
$W_q(k)$=quiescent beam kth element weight,
$A_i$=amplitude of ith source perturbation.
$\psi_i(k)$=phase of ith source perturbation at the kth element, wherein $\psi_i(k) = \frac{2\pi d}{\lambda} (\sin \theta_i - \sin \theta_0) \left[k - \left(\frac{K+1}{2}\right)\right]$, where
d=element spacing,
$\lambda$=wavelength,
K=total number of element,
$\theta_0$=quiescent mainbeam steering direction, and
$\theta_i$=direction angle of ith source;
means for determining coefficient $A_i$ via a recursive modulation trial and update routing expressed in the form:

$$A_i(n + 1) = \left(\frac{\tau(n)}{\tau(n) + 1}\right) A_i(n) + \mu_i(n)$$

where
$A_i(n)$=value of $A_i$ used in current trial,
$A_i(n+1)$=value of $A_i$ for next trial,
$\mu_i(n)$=update increment from current trial,
$\tau(n)$=integrating time constant, wherein $$\tau(n) = 7.5 + \left(\frac{80}{\sqrt{S(n)}}\right),$$

and $S(n)$=current trial value of best SNR;
means for determining the update increments from a weight perturbation modulation trial with the array output power P(t), being monitored and averaged for equal time periods during the modulation trial, said means for determining the update increments includes
(1) means for establishing an initial value of averaged P(t) for unperturbed weight W(k),
(2) means for establishing an initial value for the weight perturbation magnitude $\Delta_i$,
(3) means for applying the $\Delta_i$ as a weight perturbation modulation in plus-minus sequence for the i(th) source above wherein
$W_i^+(k) = W(k) [1 + \Delta_i \exp(\psi_i(k))]$ and
$W_i^-(k) = w(k) [1 - \Delta_i \exp(\psi_i(k))]$;
(4) means for monitoring P(t) giving two corresponding averaged output power levels
$P_i(+)$=averaged P(t) for $W_i^+$ weights and
$P_i(-)$=averaged P(t) for $W_i^-$ weights;
(5) means for determining the best $\Delta_i$ from sequence 3 above;
(6) means for updating $A_i(n)$ and W(k) with the updated values of $\mu_i(n)$ and $\tau(n)$;
a plurality of phase shifters;
a plurality of phased array elements connected to said plurality of phase shifters;
means for injecting both phase and amplitude perturbations of a mainbeam aperture distribution into the sum and difference beams.

* * * * *